E. O. KEATOR.
ROD CLIP.
APPLICATION FILED JUNE 3, 1918.
1,283,793.
Patented Nov. 5, 1918.
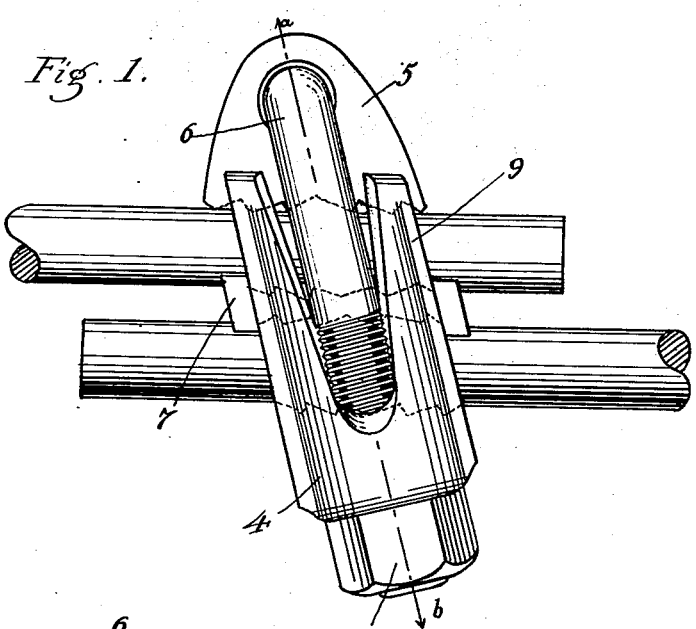
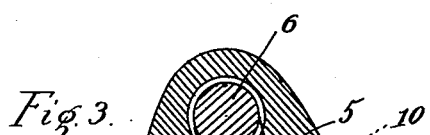
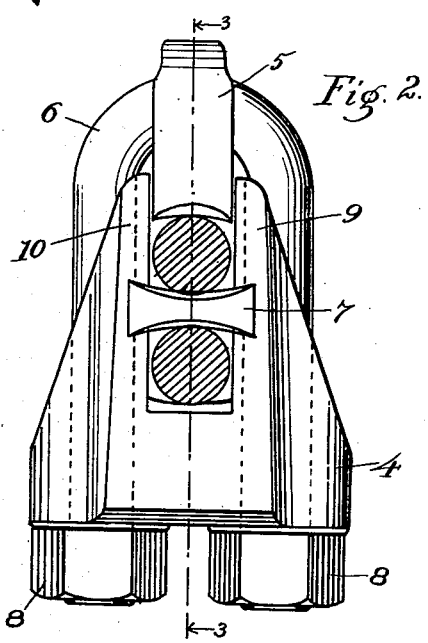
Inventor:
Edward O. Keator
By Walter F. Murray
Attorney.

UNITED STATES PATENT OFFICE.

EDWARD O. KEATOR, OF MARION, INDIANA.

ROD-CLIP.

1,283,793.	Specification of Letters Patent.	Patented Nov. 5, 1918.

Application filed June 3, 1918. Serial No. 237,888.

*To all whom it may concern:*

Be it known that I, EDWARD O. KEATOR, a citizen of the United States of America, and resident of Marion, in the county of Marion and State of Indiana, have invented a new and useful Improvement in Rod-Clips, of which the following is a specification.

An object of my invention is to produce an improved clip which, although particularly designed for use with rods, may be used for cables and in which the initial angular set position assumed by ordinary clips upon a load being brought to bear upon the members gripped by it, is provided for by constructing the clip to overcome this initial angular setting action.

This and other objects are attained in the clip described in the following specification and illustrated in the accompanying drawing in which;

Figure 1 is a side elevation of my improved clip.

Fig. 2 is an end elevation of my improved clip.

Fig. 3 is a transverse sectional view taken on the line 3—3 of Fig. 2.

My improved clip consists of a base 4, a cam 5, a U-bolt 6 mounting the cam and passing through the base, a spacer block 7 located between the cam and base, and nuts 8 upon the branches of the bolt.

The base is provided with two sets of wings 9 and 10 between which the cam operates and between which the spacer block is located. On the rod engaging surfaces of the cam, the spacer block, and the base I have provided a series of projections 11 which are designed to prevent slippage of the rods when clamped by the clip, and the form of which may be materially varied.

In the construction of the base, the cam, and the block I have so slanted the rod engaging surfaces thereof that the axial center of the clip, represented by the line *a—b* in Fig. 1, lies at an angle from the right angle position of clips of ordinary construction when they are initially clamped upon the rods or cables to be gripped by them. I have determined that ordinary clips, after having been positioned upon the rods or cables, when tension is placed upon the elements, assume an angular position, due to slippage, setting of the clip elements to firmer gripping positions, etc. I have found that the angle of this position continues to become greater as the tension upon the rods or cables continues to increase, until at about the angle of 45° the U-bolt breaks. Therefore, it would obviously be proper to apply the clip to the rods or cables at such an angle, but since the clip would slip back toward a right angle position with the rods, upon attempting to tighten it, it will have to be secured at that angle at which further slipping of the clip or slipping between the rods is prevented by reason of the friction between them. This angular position I have found to be approximately 14°—30'. Therefore, the clip disclosed in Figs. 4 and 5 has been constructed to initially account for this setting action of ordinary clips, and when once clamped upon the rods, positively prevents their slippage relatively to one another or further setting action of the clip.

Having thus described my invention, what I claim is;

1. A rod or cable clip comprising a bolt, a cam upon the bolt, a base upon the bolt, and a block between the base and cam, the object engaging surfaces of the cam, block and base being inclined in the same direction and in an amount to permit the clip to be clamped at an angle equal to the normal angle of set taken by the clip when subjected to tension by the rods or cables gripped thereby.

2. A rod or cable clip comprising a bolt, a cam upon the bolt, and a base upon the bolt, the object engaging surfaces of the cam and base being inclined in the same direction and in an amount to permit the clip to be clamped at an angle to the normal angle of set taken by the clip when subjected to tension by the rods or cable gripped thereby.

In testimony whereof I have hereunto subscribed my name this 29 day of May, 1918.

EDWARD O. KEATOR.

Witnesses:
ELIZABETH F. LENFESTEY,
JOHN W. WHARTON.